United States Patent
Edwards et al.

(10) Patent No.: US 6,289,512 B1
(45) Date of Patent: Sep. 11, 2001

(54) AUTOMATIC PROGRAM INSTALLATION

(75) Inventors: William Mitchell Edwards, Pflugerville, TX (US); Stephen Brent Gest, Fort Collins, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/204,521

(22) Filed: Dec. 3, 1998

(51) Int. Cl.[7] .................................................. G06F 9/445
(52) U.S. Cl. ................................................................ 717/11
(58) Field of Search ................................................. 717/11

(56) References Cited

U.S. PATENT DOCUMENTS

| | | | |
|---|---|---|---|
| 5,630,066 | 5/1997 | Gosling | 395/200.09 |
| 5,727,147 | 3/1998 | Van Hoff | 395/200.3 |
| 5,937,411 * | 8/1999 | Becker | 707/103 |
| 5,983,348 * | 11/1999 | Ji | 713/200 |
| 6,026,437 * | 2/2000 | Muschett et al. | 709/219 |
| 6,047,318 * | 4/2000 | Becker et al. | 709/217 |
| 6,061,743 * | 5/2000 | Thatcher et al. | 709/302 |

* cited by examiner

*Primary Examiner*—Mark R. Powell
*Assistant Examiner*—Michael B. Holmes
(74) *Attorney, Agent, or Firm*—David A. Mims, Jr.; Robert V. Wilder

(57) ABSTRACT

A method and implementing system is provided by which software is formatted to include a selected program together with installation instructions for the installation of the selected program. In an exemplary embodiment, the software is an archive containing the selected program and an installer program. In a specific example, a manifest file, which is contained within a JAR file includes a manifest tag which specifies a class to be executed for the installation process. In another exemplary embodiment, a different tag indicates to automatically run an executable "setup.exe" for the installation process. Functions of the installation process may include extracting contents of multiple JAR files, executing self-extracting executables, or setting environment variables such as CLASSPATH. Uninstall instructions may also be packaged in the JAR.

20 Claims, 4 Drawing Sheets

AUTOMATIC PROGRAM INSTALLATION

FIELD OF THE INVENTION

The present invention relates generally to information processing systems and more particularly to a methodology and implementation for providing for automatically installing Java bean programs in an operational environment.

BACKGROUND OF THE INVENTION

In networked computer applications and systems, from the world wide web to networked systems installed in business enterprises such as banks and airlines, there is a frequent need to install new "code" or programming for new or existing programs and applications. New programs are continually being provided and all applications are constantly being upgraded and enhanced to stay current with the business developments and changes for the business enterprise.

In networked computer systems, a plurality of computers are connected together and one or more of the computers generally performs the function of a network server. A network may be established through the hard-wired interconnection of a plurality of computer terminals in a local network or on a wider scale such as the Internet or world wide web which may include telecommunication links. In any case, the network server acts as the central control unit for providing access to files, programs and program execution to the individual computers connected within the network. In general, a networked computer terminal will "logon" to the network and obtain access to a network server. The network server will download a homepage presentation on the user's terminal which may include and audio and video effects. From the initial screen display, a user may designate any other "address" to get to another "location" or screen display. The user may also select from a plurality of functions which may be presented for user selection on the initial display. Generally, almost all screen displays include designated selection areas on the screen where the user may point a selection device such as a mouse-controlled pointer, and "click" on the designated screen area to invoke a displayed function, or menu for other function selection options. When the homepage or selection screen is downloaded from the server, many small programs or "applets" are also downloaded at the same time to the user's terminal memory. Those applets are associated with different ones of the designated screen selection areas and are executed when a user makes a selection or clicks on one of the selection areas on the display. The applets, in turn, may call for the presentation of a new user interface screen, or a new or different section of a portion of the screen, such as a pop-up menu or other graphical user interface (GUI) which may be within a framed or windowed sub-section of the main homepage.

Java is the programming language of the Internet or world wide web. Generally, home pages including hypertext references and reference pages are written in HTML (hypertext markup language). Network browsers installed at user terminals or network servers are Java-enabled and have a Java virtual machine embedded in the browser to respond to Java programs. Applets are small programs which are designed to operate within Internet pages. Typically, the hypertext statement is underscored to indicate that its selection will effect the display of a referenced item. "Java Beans" are portable platform-independent components written in the Java programming language. "Java Beans" or "beans" are program components that may be used and re-used in applets or other Java programs. Java beans allow developers to create reusable software components that can be assembled together using visual application builder tools such as VISUALAGE by IBM. Thus, "beans" can be manipulated visually in a builder tool and combined to create traditional applications in addition to web-oriented applets. Generally, web pages may include several bean component programs on any individual page. Beans are also generally associated with a visual function and can be downloaded from a server or other location to be implemented within a user's program on a user terminal.

Java beans are packaged and delivered in JAR (Java Archive) files, which is a new technology supported by JDK (Java Development Kit) 1.1. JAR files are used to collect Java class files, serialized objects, images, help files and similar resource files. In many Internet sessions when a user is accessing or connected to a site in the World Wide Web, the user may need to or desire to acquire a program or other downloadable content, typically in the form of a JAR file, from that site. The user is generally able to "download" a selected program from the remote site and the program will be transferred to the user terminal. However, not all user terminals operate on the same platform or use the same operating system. For example, a user terminal may be an IBM compatible terminal running a PC-based operating system while the accessed site may be a different hardware platform running a Unix operating system. Thus, even though a target program or JAR file may be downloaded to a user terminal, it must still be properly installed to operate on the specific platform at the user's terminal. Currently there is no standard way of accomplishing this installation process. Typically, the instructions for installation are presented in a "README" file which must be read and manually implemented by a user in order to install the JAR file on the user's particular system.

Thus, there is a need for a method by which files may be transferred or downloaded among various terminals or sites in a network and automatically installed at the receiving site.

SUMMARY OF THE INVENTION

A method and implementing system is provided by which software is formatted to include indicia representative of installation instructions for the software for use in installing the software. In an exemplary embodiment, the software includes a selected program packaged in an archive along with an installer program. In one exemplary embodiment, the archive is a JAR file which contains a manifest file. The manifest file includes a manifest tag which specifies a class to be executed for the installation process. The installer program is extracted from the archive and used to install the selected program. In one embodiment, the archive may be downloaded by a receiving terminal from a remote site for installation of the selected program at the receiving terminal. Functions of the installation process may include extracting contents of multiple JAR files, executing self-extracting executables, or setting environment variables. Uninstall instructions may also be packaged in the archive file.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

Figure 1:
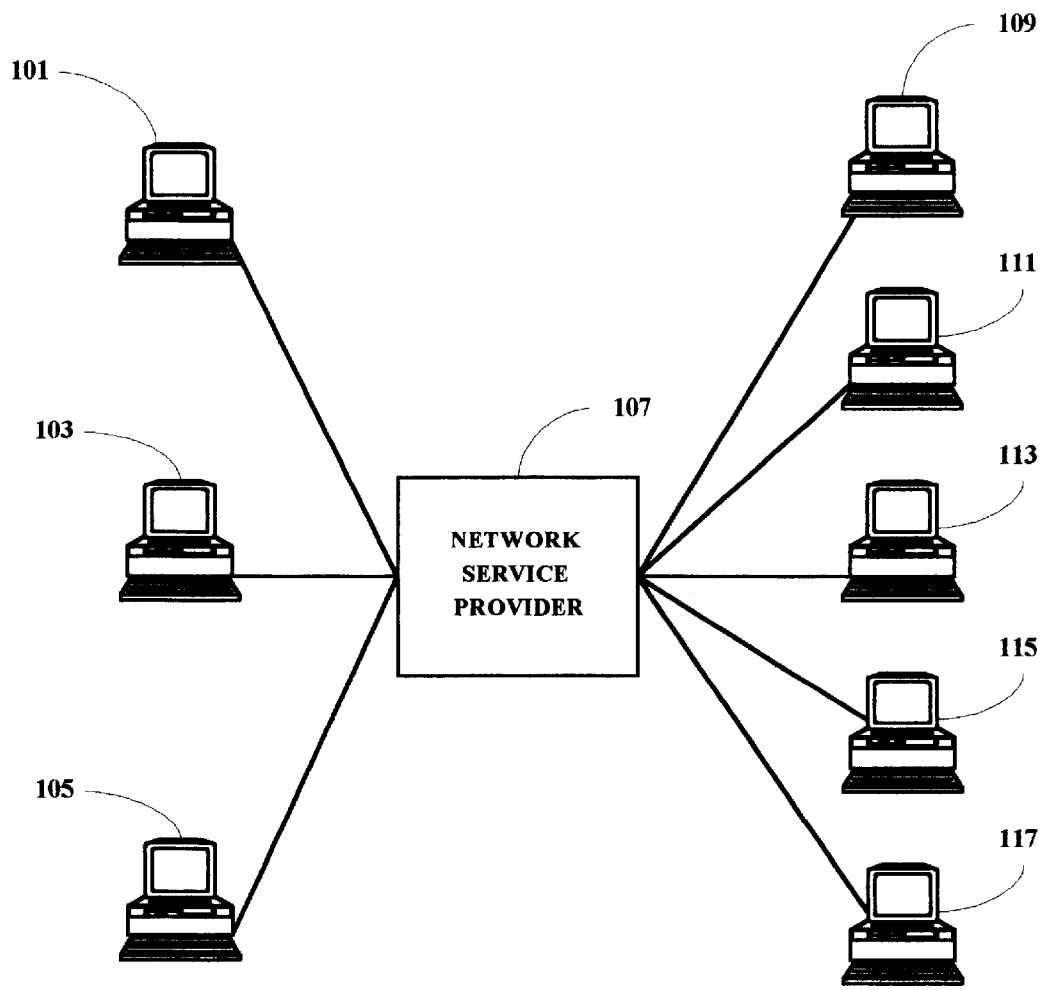
FIG. 1 is an illustration of an exemplary networked system in which the present invention may be implemented.

With reference to FIG. 1, there is shown one example of a networked application in which the present methodology may be implemented. In the example, a networked system includes a series of user terminals 101, 103 and 105, which are connected to a network service provider or network server 107. The server 107 is also connected to a plurality of network site terminals or web sites, 109, 111, 113, 115 and 117. For an Internet application, each user terminal is connected to an Internet service provider which, in turn, enable or establishes connections to many different web sites as illustrated. Each web site generally includes its own server which may be accessed by a user terminal through the network service provider when the user is running the user's web browser program. A user may also access and download directly from the server 107. Although FIG. 1 shows one example of a network configuration, it will be appreciated that the disclosed methodology will apply to any networked configuration where one computer is connected to another computer and able to download or transfer software or programs from one of the computers to the other. In the present example, the Internet is the exemplary network and the code being transferred or downloaded is illustrated as a JAR file.

Figure 2:
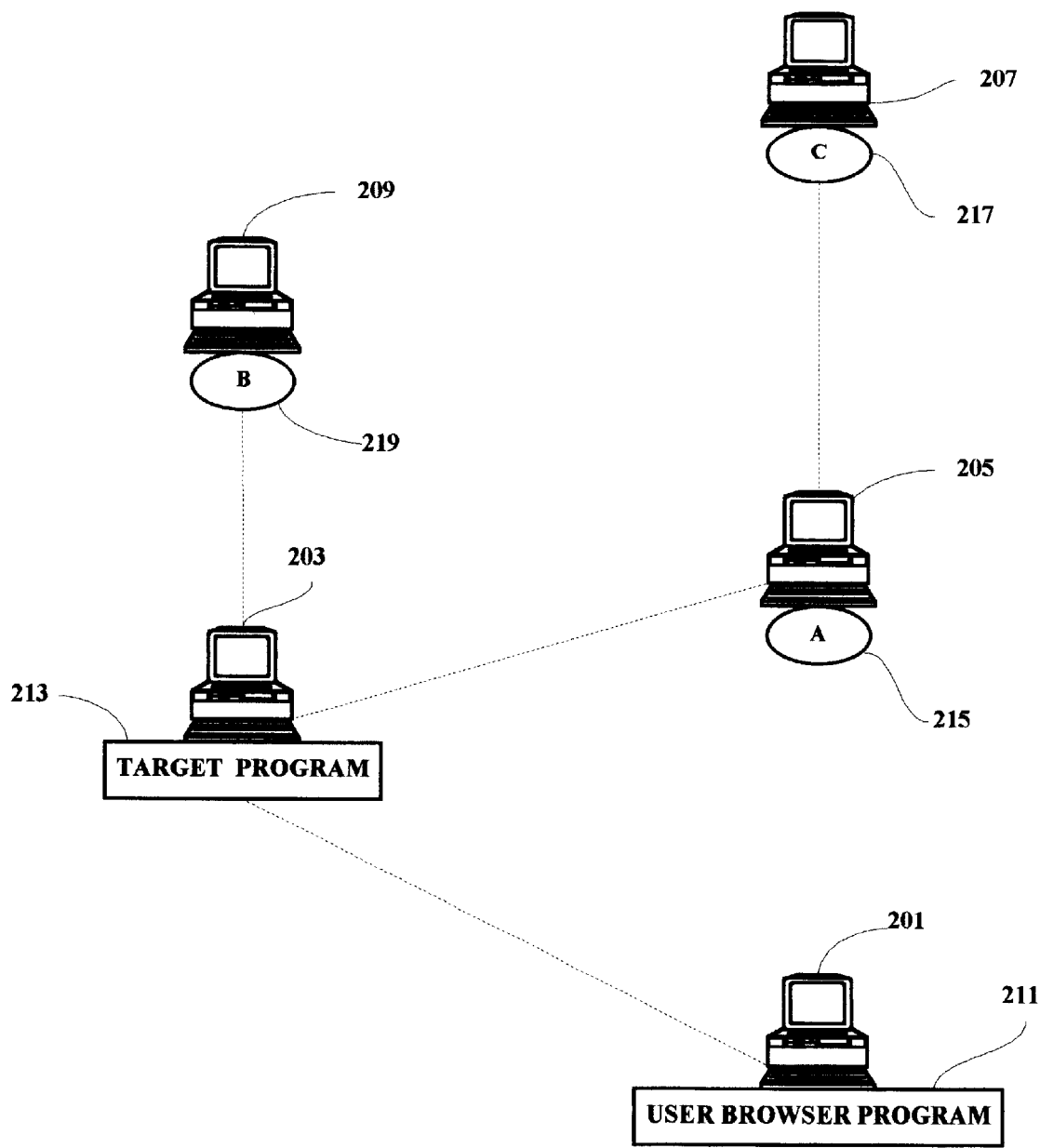
FIG. 2 is an illustration of an exemplary session connection in which the disclosed methodology may be used.

As shown in FIG. 2, an exemplary session is illustrated in which a user terminal 201 running a browser program 211, is connected to a second terminal or site 203. The second terminal 203 in the present example contains a "target program" 213 which the user wishes to download from the second site 203 to the user's terminal 201. The target program 213 however, depends on beans or components which are not, at least in their most current version, at the site of the target program. For example, the target program 213 depends on beans "A" 215, located at site 205, and bean "B" 219, which resides at site 209. In addition, bean A depends on bean "C" 217 which resides at site 207. Accordingly, to download and run the entire target program, the target program itself 213 must be downloaded to the user terminal 201 as well as beans A, B and C. Further, beans A, B and C may have differing installation instructions for installation of each component on the user's terminal 201.

In providing a solution to enable automatic installation of programs downloaded from remote sites, an Internet environment is used in the example where the files to be downloaded are in the form of JAR files. A JAR file is a "ZIP" format archive file that has a manifest file with additional information describing the contents of a JAR file. In accordance with the present invention, the manifest file is used to provide information concerning installation of the associated JAR file.

As hereinbefore noted, a JAR file contains a "manifest" file with additional information describing the contents of the JAR file. The manifest file in a JAR archive provides information on selected parts of the contents of the archive. The manifest is a sequence of sections separated by empty lines. Each section contains one or more "headers", each of the form <tag>:<value>. This is open-ended so that one or more additional manifest header tags can be added to describe new attributes as needed.

The disclosed methodology adds new manifest tags "Installer" and "Uninstaller" to provide tools with enough information to allow the tools to install content contained in the JAR file of which the manifest forms a part, and to uninstall that content at a later time. Headers with the new tags can have a value of "Java" or "Native". Only one file listed in a manifest should have a header with an "Installer" tag associated with it. Similarly, only one file listed in the manifest should have a header with an "Uninstaller" tag associated with it. The same file can have both a header with an "Installer" tag and a header with an "Uninstaller" tag associated with it.

For example, a section for the file "com/mycompany/install/InstallBean.class" may include a header with an "Installer" tag and a value of "Java". The manifest section for this file could also include a header with an "Uninstaller" tag and a value of "Java". Another example is a header of "Installation:setup.exe" which would indicate that "setup.exe" is to be run for the installation process.

A Java class file in a JAR file is identified as the installer for the JAR file by a header in its manifest section with a tag of "Installer" and a value of "Java". A Java install program must implement Install interface shown below. A Java class file in a JAR file is identified as the uninstaller by a header in its manifest section with a tag of "Uninstaller" and a value of "Java". A Java uninstall program must implement the Uninstall interface shown below.

```
package java.util.installation;
import java.util.zip.ZipInputStream;
abstract class JarClassLoader extends ClassLoader {
    protected ZipInputStream fJar;
    protected JarClassLoader (ZipInputStream jar) {fJar=
        jar;};
    protected ZipInputStream getJar() {return fJar};
};
interface Install {
    boolean install (ZipInputStream jar, ClassLoader cl);
};
interface uninstall {
    boolean Uninstall ();
}
```

An executable for the native operating system platform in a JAR file is identified as the installer for the JAR file by a header in its manifest section with a tag of "Installer" and a value of "Native". A native installer program is executed by extracting it from the JAR file and invoking the "java.lang.Runtime.exec(String[])" method. The installer program is specified as the executable and the path name to the JAR file is specified as a parameter. An executable for the native operating system platform in a JAR file is identified as the uninstaller in a similar manner, except that the header tag is "Uninstaller". No parameters are passed to the uninstaller program.

Functions of the installation process include extracting the contents of a JAR file, executing self-extracting executables, and/or setting environment variables such as CLASSPATH. Functions of the uninstallation process include removal of files which were installed, and removal and/or unsetting of environment variables such as CLASSPATH. Flow charts illustrating exemplary methods in accomplishing the installation and uninstallation processes are shown in FIG. 3 and FIG. 4, respectively.

Figure 3:
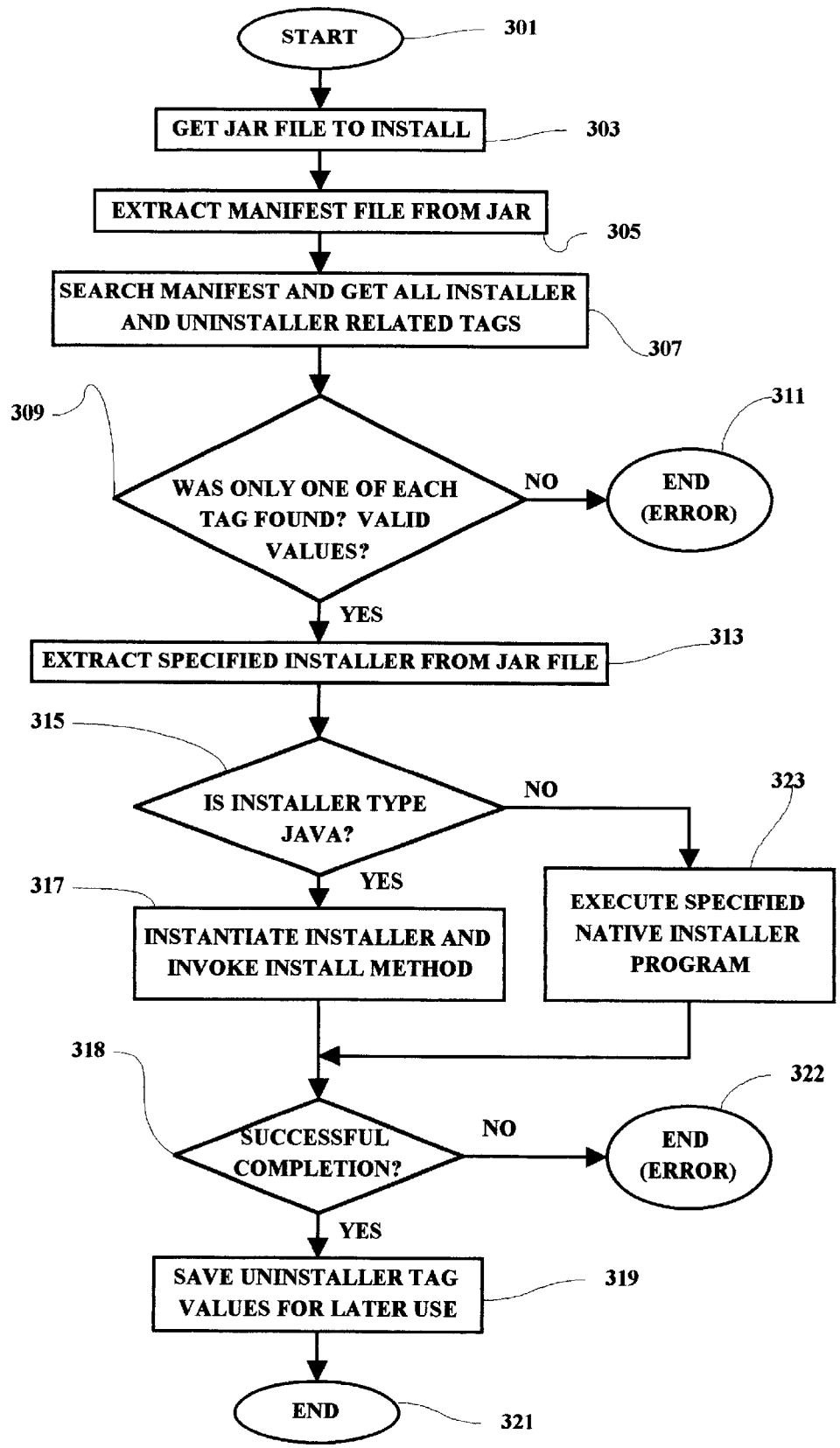
FIG. 3 is a flow chart illustrating an exemplary sequence of operations in an exemplary implementation of the disclosed methodology.

As shown in FIG. 3, after the process starts 301, the JAR file to be installed is retrieved 303. How the JAR is obtained depends on the tool. The tool might prompt the user to specify a JAR file stored on an accessible file system, or it might access the JAR file from the network. The manifest is then extracted from the JAR 305. Only the installer class is extracted. If additional classes are needed, the installer must extract them from the JAR file. Next, a search is done 307 for all installer and uninstaller tags. Next, a check is made 309 to determine that only one of each tag was found, and if so, the specified installer is extracted from the JAR file 313. If more than one tag is found, or if the values are invalid, then the process ends with an error condition 311. This process may also include other syntax error checks. After the specified installer code is extracted from the JAR file 313, a check is made 315 to determine whether the installer type is Java or Native. If the installer type is Java, then the installer is instantiated 317 and the "install" method is invoked. If the installer type is Native, the specified native installer program is executed 323. A check is then made to determine if the installation was successful 318. If the installation was not successful, the process is ended with an error condition 322. If the installation was successful, the Uninstaller tag's value extracted from the manifest and the name of the file with which it is associated are then saved 319 for later use and the process is completed 321.

Figure 4:
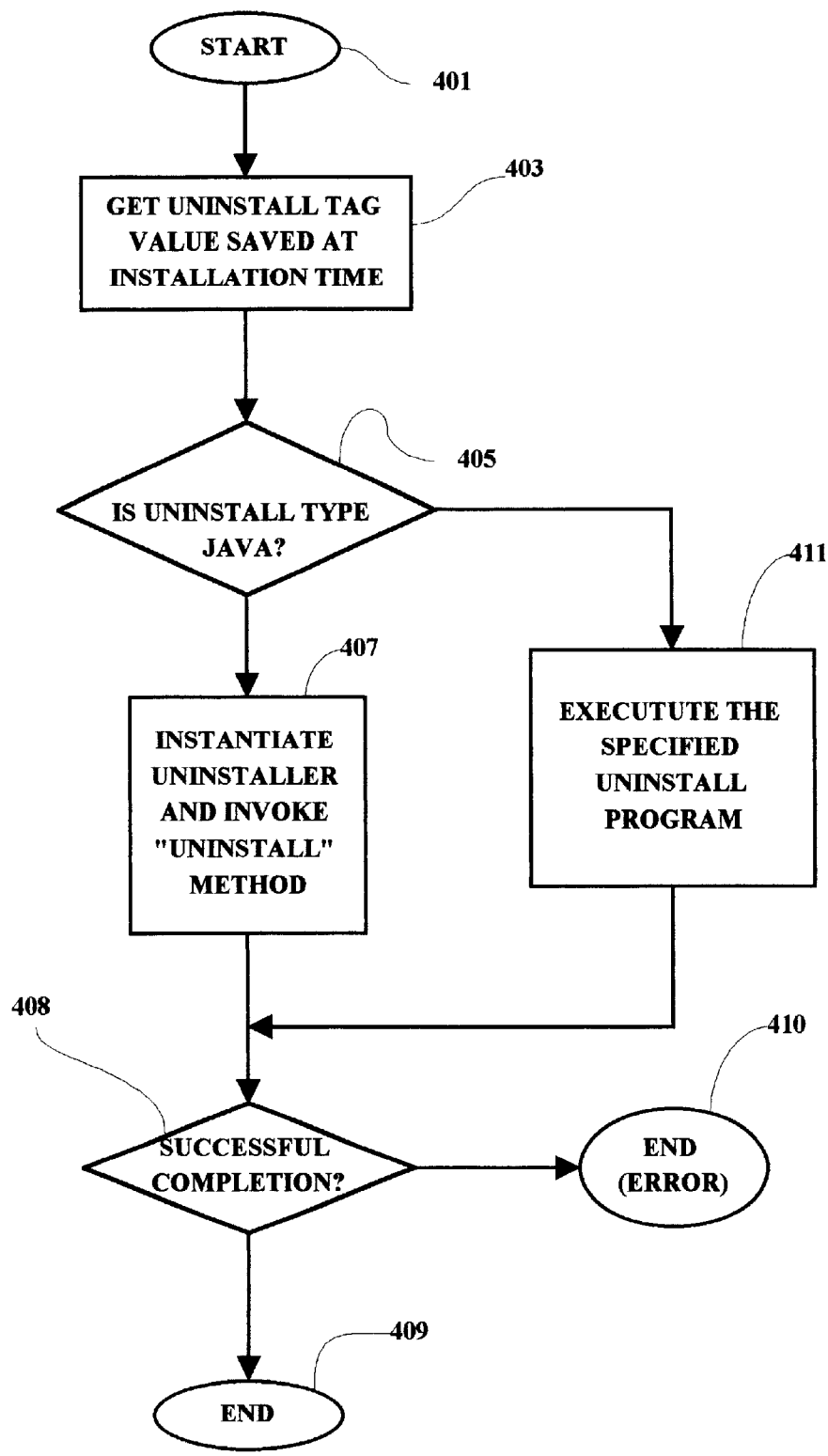
FIG. 4 is a flow chart illustrating an exemplary sequence of operations in another exemplary implementation of the disclosed methodology.

In FIG. 4, the uninstall methodology is illustrated. As the process starts 401, the uninstall tags, which were saved at installation time, are retrieved 403 and a check is made 405 to determine the type of code for the uninstall program to be used to uninstall the bean from the system. If the type of code is Java, then the uninstaller is instantiated and the uninstall method is invoked 407. This class must implement the "java.util.installation.Uninstall" interface. The class is assumed to be in the classpath as a result of the JAR file installation and setup. For a native installer program, the specified native uninstall program is executed 411. This is assumed to be in a directory specified in the PATH environment variable as a result of installation. After execution of the uninstall program, a check is made 408 to determine if the uninstallation process was successful. If successful, the process is completed 409. If the uninstallation process was not successful, the process ends 410 in an error condition.

The method and apparatus of the present invention has been described in connection with a preferred embodiment as disclosed herein. The disclosed methodology may be implemented in a wide range of sequences to accomplish the desired results as herein illustrated. Although an embodiment of the present invention has been shown and described in detail herein, along with certain variants thereof, many other varied embodiments that incorporate the teachings of the invention may be easily constructed by those skilled in the art, and even included or integrated into a processor or CPU or other larger system integrated circuit or chip. The disclosed methodology may also be implemented solely in program code stored on a disk or diskette (portable or fixed), or other memory device, from which it may be executed to achieve the beneficial results as described herein. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for installing a selected program from an archive of files containing said selected program, said method comprising:

extracting an installer program contained in said archive; and executing said installer program to install said selected program.

2. The method as set forth in claim 1 and further including:

transferring said archive to a remote terminal over a network connection, said archive comprising a JAR file.

3. The method as set forth in claim 2 wherein said JAR file includes a manifest file, said installer program being included in said manifest file.

4. The method as set forth in claim 3 wherein said JAR file is transferred from a network server to a network terminal.

5. The method as set forth in claim 3 wherein said JAR file is transferred from a first terminal to a second terminal, said first and second terminals being connected through a telecommunication network.

6. A method for downloading at least one selected program from a first terminal at a remote location to a receiving terminal, said method comprising:

transferring an archive of files, said archive containing said one selected program;

receiving said archive; and extracting an installer program from said archive, said installer program being effective for installing said one selected program at said receiving terminal.

7. The method as set forth in claim 6 and further including a step of:

installing said one selected program using said installer program.

8. The method as set forth in claim 7 wherein said archive is a JAR file.

9. The method as set forth in claim 8 wherein said JAR file includes a manifest file, said installer program being included in said manifest file.

10. The method as set forth in claim 9 wherein said one selected program is transferred from a network server to a network terminal.

11. The method as set forth in claim 9 wherein said one selected program is transferred from a first terminal to a second terminal, said first and second terminals being connected through a telecommunication network.

12. The method as set forth in claim 9 wherein said installer program is associated with an install tag in said manifest file.

13. The method as set forth in claim 12 wherein said receiving terminal is selectively operable for:

determining that only one install tag is present in said manifest file.

14. The method as set forth in claim 13 wherein said receiving terminal is further selectively operable for:

determining that said installer program is a Java type;

instantiating said installer program; and invoking an install method to effect said installing.

15. The method as set forth in claim 13 wherein said receiving terminal is further selectively operable for:

determining a type of said installer program prior to said installing.

16. The method as set forth in claim 12 wherein said receiving terminal is further selectively operable for:

determining that said installer program is a Java type;

instantiating said installer program; and invoking an install method to effect said installing.

17. The method as set forth in claim 1 and further including:

transferring uninstall information with said archive, said uninstall information including instructions for uninstalling said one selected program after said one selected program is installed at said remote terminal.

18. The method as set forth in claim 6 and further including:

extracting uninstall information from said archive.

19. A storage medium including machine readable coded indicia, said storage medium being selectively coupled to a reading device at a receiving terminal, said reading device being selectively coupled to processing circuitry, said reading device being selectively operable to read said machine readable coded indicia and provide program signals representative thereof, said program signals being selectively operable for installing a selected program from an archive of files containing said selected program, said program signals being effective for:

extracting an installer program contained in said archive; and executing said installer program to install said selected program.

20. A communication system comprising:

a first terminal;

a second terminal; and a coupling means for connecting said first terminal with said second terminal; and means for enabling a transfer of a selected archive of files from said first terminal to said second terminal; and means for extracting an installer program from said archive, said installer program being effective for installing said selected program at said receiving terminal.

\* \* \* \* \*